Figure 1:
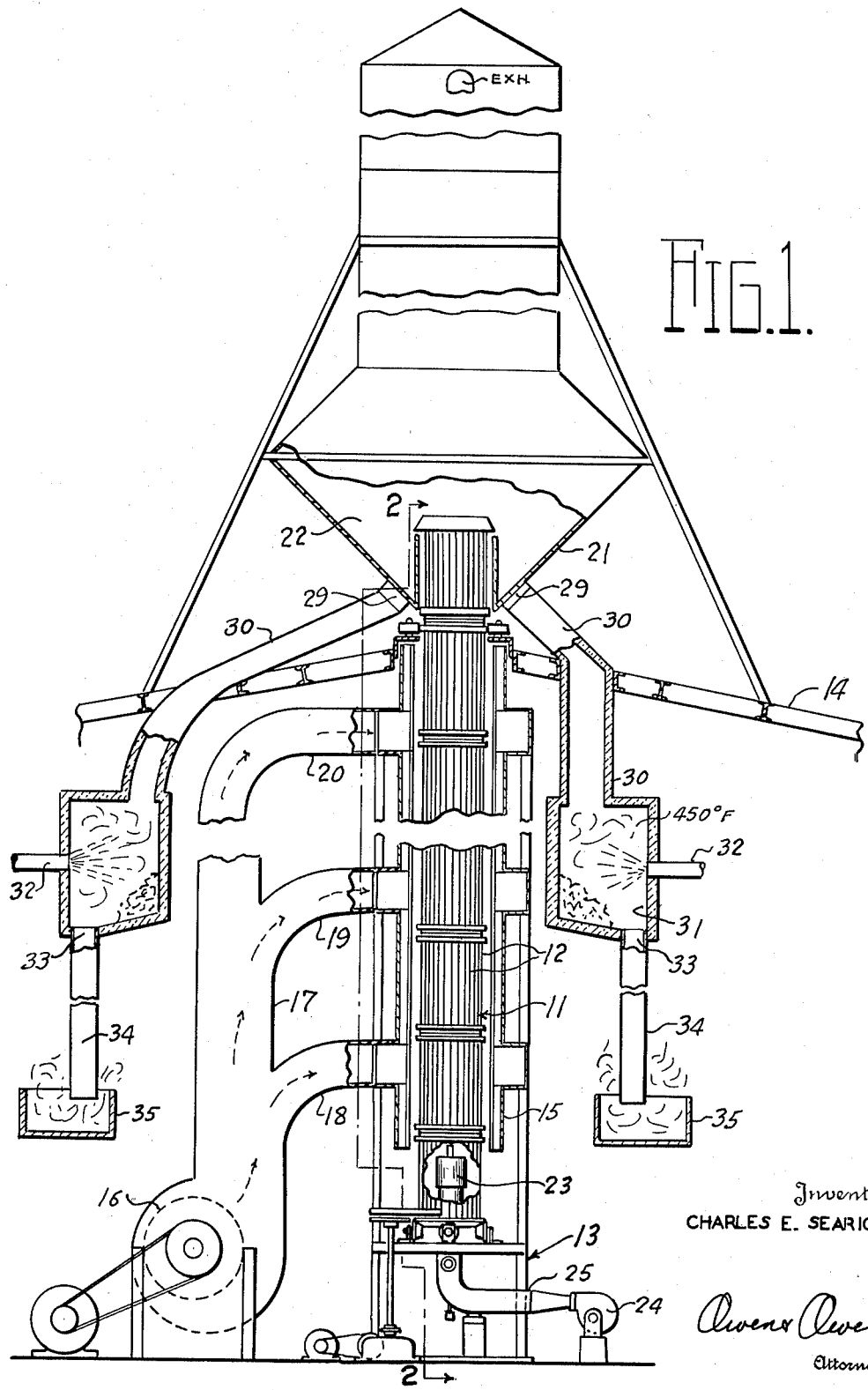

Jan. 17, 1956

C. E. SEARIGHT 2,730,841

PRODUCTION OF SILICONE-COATED GLASS BEADS

Filed Aug. 19, 1954

2 Sheets-Sheet 1

Inventor
CHARLES E. SEARIGHT

Owen & Owen
Attorneys

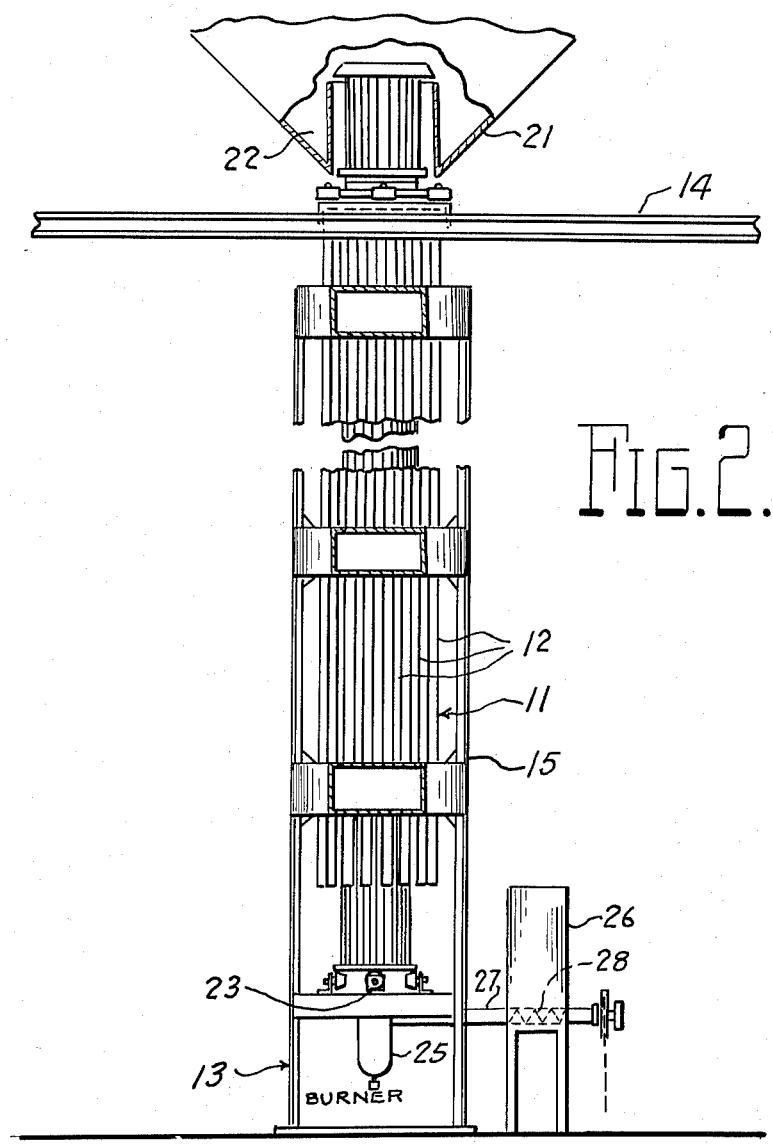

United States Patent Office 2,730,841
Patented Jan. 17, 1956

2,730,841

PRODUCTION OF SILICONE-COATED GLASS BEADS

Charles E. Searight, Jackson, Miss.

Application August 19, 1954, Serial No. 451,012

5 Claims. (Cl. 49—79)

This invention relates to the production of silicone-coated glass beads, and more particularly, to a method for the production thereof which includes the step of spraying a fog or mist of a siloxane material into an enclosed zone, while passing therethrough hot beads discharged from a gas expansion zone in which beads are normally separated from a stream of combustion products during the course of their production.

The use of glass beads in reflex reflector markings for highways, highway signs, curbings, and the like, has been suggested. During relatively recent years the use of highway markings embodying the reflex reflection principle has become increasingly popular with State, county and even municipal highway departments. It has been found that such markings not only increase the night visibility, but, also, that the presence of the glass beads markedly increases the life of the lines. Such lines have been produced by painting desired markings and then dropping glass beads into the paint while still wet, and have also been produced by application of a paint containing the beads. Particularly in the production of such markings by the former technique, substantial difficulty has been encountered because glass beads have a tendency to stick together after exposure to a relatively humid atmosphere. No completely successful manner has been found for avoiding the clogging of machines designed for application of the beads due to such sticking.

The ability of various silicone materials to coat glass and thereby prevent the wetting thereof by water, is well known, having been suggested by Rockow in some of the relatively early patents in the silicone field. However, the application of a siloxane coating to glass beads having a maximum diameter of about 10 mils, and ranging down to slightly over 1 mil, and then converting such coating to a silicone, is an extremely difficult operation. Although it was early learned that a silicone coating could be applied merely by dipping a plurality of such beads therein, and that the resulting siloxane coating could be cured to a silicone by the action of heat, advantageously in a stream of air, it was also found that such an operation would be entirely too cumbersome for the processing of several million beads per day as would be required even in a relatively small commercial bead plant.

The present invention is based upon the discovery that the siloxane solution or dispersion can be sprayed as a fog or mist into an enclosed zone, and that by passing through such enclosed zone hot beads discharged from a gas expansion zone in which beads are normally separated from combustion products during the course of their production, a coating can be formed on the individual beads while they are in the enclosed zone. This coating will then cure to a silicone as it absorbs heat from the hot bead, so that neither an additional handling step nor extra heat above that required for the production of uncoated glass beads is required to effect the silicone coating.

It is, therefore, an object of the invention to provide an improved method for producing glass beads coated with a silicone.

Other objects and advantages of the invention will be apparent from the description which follows, reference being had to the accompanying drawings, in which:

Fig. 1 is a side elevation of an apparatus embodying the invention, with parts broken away, and some parts shown in central vertical section; and Fig. 2 is a different side elevation of the stack portion of the apparatus taken at right angles to the view of Fig. 1.

According to the invention an improved method for producing silicone-coated glass beads is provided. This method comprises the formation of glass beads in the usual manner, namely, by introducing small irregularly shaped particles of glass into a stream of a combustible gas traveling at such velocity that the glass particles are carried thereby into a combustion zone where the gas is burned and the glass heated to its softening temperature, whereupon spherulitization of the glass particles occurs, and the resulting combustion products and glass beads carried thereby are then passed into a settling zone having a larger cross-sectional area than the combustion zone. In the settling zone the rate of gas flow decreases and the beads settle therefrom. Silicone-coated glass beads are produced according to the invention by introducing a fog or mist of siloxane material into an enclosed zone, while passing glass beads at a temperature from about 300° F. to about 500° F. through such zone. It has been found that the siloxane fog or mist should be introduced into the enclosed zone in a quantity amounting to from about 0.5 part by weight to about 10 parts by weight, based upon total siloxane solids content, per 10,000 parts by weight of beads introduced from the settling zone. The improved step according to the invention comprises the introduction of the spray or mist of a siloxane material into such enclosed zone, where it comes in contact with the beads and provides the thin coating thereon. It has been found that by supplying a spray or mist of a siloxane material which cures in not more than about two hours at 100° F. the sensible heat given up by the beads in cooling to room temperature from about 300° F. to about 500° F., preferably from about 425° F. to about 475° F., is sufficient so that a sensibly dry silicone coating is achieved before the beads are discharged from the enclosed zone.

Referring now to the drawings, and especially to Fig. 1, apparatus suitable for the production of silicone-coated glass beads according to the method of the invention is shown. The apparatus comprises a stack indicated generally at 11 made up of a plurality of superposed tubular sections 12, and suitably mounted on a frame member indicated generally at 13, which constitutes no part of the instant invention. The stack 11 is shown as extending through the peak portion of a covering roof 14.

The stack 11 is encircled by an air shaft 15 also mounted on the frame portion 13. Air is supplied to the space between the air shaft 15 and the stack 11 by a blower 16 having an outlet conduit 17 from which conduits 18, 19 and 20 lead air to the space between the shaft 11 and the stack 15.

The stack 11 at its upper end extends above the upper end of the air shaft 15 and enters the bottom of a casing 21 forming an expansion chamber 22.

Projected up into the lower end of the stack 11 is a burner 23 of a type commonly used in apparatus of this character and which is supplied with a mixture of gas and air from a blower 24 through a conduit 25. Powdered glass in desired quantity is supplied to the conduit 25 from a hopper 26 (see Fig. 2) through a conduit 27 that enters the conduit 25 adjacent the bottom of the burner. The feed of the glass through the conduit 27 is induced by a worm 28 suitably driven in any desired manner (not illustrated).

In operation, the combustible gas mixture and the powdered glass carried thereby are discharged by the burner 23 up into the lower end of the stack 11. Combustion takes place above the burner. The powdered glass, as it passes through the stack with the hot products of combustion, is melted and formed into beads. Auxiliary air from the blower 16 cools the stack wall below the temperature it would otherwise assume by virtue of the passage therethrough of the hot gases, and minimizes the tendency of the melted glass to collect on the inner wall of the stack. As the gases are discharged from the stack 11 into the chamber 22 they expand and travel at a lower velocity, so that the entrained beads fall out and are deposited on the conical bottom of the chamber. The beads thus deposited roll to the bottom of the chamber, and therefrom through spouts 29 (Fig. 1) into and through conduits 30 to enclosed zones 31. The length of the conduits 30, which are preferably insulated, is such that the beads are deposited in the enclosed zones 31 at a temperature between about 300° F. and about 500° F. A fog or mist of a siloxane material is introduced into the zones 31 by sprays 32. It has been found that the volume of each enclosed zone 31 should be from about 40 cubic feet to about 110 cubic feet, most desirably about 75 cubic feet per 1,000 pounds per hour of glass beads treated therein.

The use of a smaller treating zone results in incomplete coverage of the beads with the siloxane and the finally cured silicone material, while the use of a substantially larger treating zone results in an undesirably thick coating, and waste of material.

Beads are discharged from the treating zones 31 through spouts 33 and insulated conduits 34 into receivers 35. It will be noted that the only exhaust from the zone 31 is downward through the conduits 34, so that siloxane material vaporized in the enclosed zone by contact with the hot beads therein passes downwardly with the beads, thus assuring complete coating.

The following example is intended solely for the purpose of further illustrating the production of silicone-coated glass beads according to the invention, and is in no way to be construed as a limitation thereon.

*Example*

Glass beads were produced and silicone-coated in apparatus substantially as shown in the attached drawings, except that only one conduit 30, treating zone 31, conduit 34 and collector 35 were employed, according to the following procedure:

A mixture of natural gas and air was introduced through the conduit 25, and was admixed with glass cullet in a known manner. Cooling air was blown into the space between the stack 11 and the air shaft 15. Spherical glass beads ranging in particle size from about one to about ten mils were removed from the chamber 22 at a rate of approximately 225 pounds per hour through the spout 29 and the conduit 30, and admitted to the treating zone 31. A commercially available water emulsion of a silicone of 50 weight per cent solids concentration diluted with about 85 volumes of water per volume of the silicone to produce a diluted emulsion containing about 0.6 per cent of silicone solids was sprayed into the treating zone 31 through conventional spray equipment producing a fan-shaped spray. The beads entering the treating zone 31 were at a temperature of about 450° F. It was found that beads discharged from the lower end of the conduit 34 into the receiver 35 were dry to the touch and that silicone vapors or water vapor, or both, passed from the lower end of the conduit 34 and were discharged to the air. Although the beads were sensibly dry when they entered the receiver 35, additional curing for from 2 to 24 hours as the coated beads cooled to room temperature was found to improve the silicone film. It has also been found that such additional curing should be effected with the beads exposed to air.

After the coated beads had cooled to room temperature, it was found that they were sufficiently water repellent that they would float on water, even if they were immersed and then immediately placed on a water surface.

The specific siloxane material used in the preceding example is commercially available under the trade designation "81394." Other water emulsions of siloxane materials have also been used satisfactorily, and water solutions of siloxanes are equally operable, although their greater cost makes their use commercially undesirable since the less expensive water emulsion is satisfactory. Other siloxane materials can similarly be used in practicing the method of the invention, for example, organic solvent solutions or dispersions, but the use of water emulsions or solutions is usually preferred for economic reasons. Further, if an organic solvent solution of a siloxane is used in the method of the invention, care must be taken to avoid a fire hazard, or the discharge of toxic vapors in a plant area.

It has been found to be advantageous that the conduits 30 and 34, as well as the zones 31, be insulated to minimize the loss of heat from the beads in passing therethrough, and, correspondingly, to facilitate the retention of heat by the glass beads and, therefore, increase the supply of available heat for water or other solvent vaporization and for cure of the siloxane to a silicone.

It will be apparent that various changes and modifications can be made from the specific details of the method of the invention discussed without departing from the spirit of the attached claims.

What I claim is:

1. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement comprising spraying from about 0.5 to about 10 parts by weight, based upon siloxane solids, of an aqueous emulsion containing from about 0.3 to about 1 per cent by weight of siloxane solids, which dispersion is curable in no more than two hours at a temperature of about 100° F., into an enclosed zone while introducing into the enclosed zone, directly from the settling zone, 10,000 parts by weight of glass beads at a temperature from about 425° F. to about 475° F., and removing from the enclosed zone beads coated with a sensibly dry silicone.

2. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement comprising spraying from about 0.5 to about 10 parts by weight, based upon siloxane solids, of a dispersion containing from about 0.3 to about 1 per cent by weight of siloxane solids, which dispersion is curable in not more than two hours at a temperature of about 100° F., into an enclosed zone while introducing into the enclosed zone, directly from the settling zone, 10,000 parts by weight of glass beads at a temperature from about 425° F. to about 475° F., and removing from the enclosed zone beads coated with a sensibly dry silicone.

3. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement comprising spraying from about 0.5 to about 10 parts by weight, based upon siloxane solids, of a dispersion containing from about 0.3 to about 1 per cent by weight of siloxane solids, which dispersion is curable in not more than two hours at a temperature of about 100° F., into an enclosed zone while introducing into the enclosed zone, directly from the settling zone, 10,000 parts by weight of glass beads at a temperature from about 300° F. to about 500° F., and removing from the enclosed zone beads coated with a sensibly dry silicone.

4. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement comprising spraying from about 0.5 to about 10 parts by weight, based upon siloxane solids, of a dispersion of a siloxane curable in not more than two hours at a temperature of about 100° F. into an enclosed zone while introducing into the enclosed zone 10,000 parts by weight of glass beads at a temperature from about 300° F. to about 500° F., and removing from the enclosed zone beads coated with a sensibly dry silicone.

5. In a method for producing glass beads which comprises introducing irregular shapes of powdered glass into a stream of gases containing oxygen and a combustible compound, and moving at a velocity sufficient that the glass is carried by the gases into a combustion zone where the combustible compound is burned, the glass is fused and assumes a generally spherical shape, and products of combustion carry the spheroidized glass into a settling zone of greater diameter than the combustion zone, discharging products of combustion from the settling zone, and removing glass beads from the bottom of the settling zone, the improvement comprising spraying from about 0.5 to about 10 parts by weight, based upon siloxane solids, of an aqueous emulsion containing from about 0.3 to about 1 per cent by weight of siloxane solids, which dispersion is curable in not more than two hours at a temperature of about 100° F., into an enclosed zone while introducing into the enclosed zone, directly from the settling zone, 10,000 parts by weight of glass beads at a temperature from about 425° F. to about 475° F., transferring, from the enclosed zone to a receiver, beads coacted with a sensibly dry silicone, and allowing such beads to cool to about room temperature in contact with air.

References Cited in the file of this patent
UNITED STATES PATENTS

| | | |
|---|---|---|
| 2,600,963 | Bland | June 17, 1952 |
| 2,625,512 | Powell | Jan. 13, 1953 |
| 2,630,656 | Kramer et al. | Mar. 10, 1953 |